| United States Patent [19] | [11] Patent Number: 5,049,537 |
| --- | --- |
| Najjar et al. | [45] Date of Patent: Sep. 17, 1991 |

[54] STABLE SOLID PHASES INVOLVING $V_2O_3$ - $TIO_2$ AND MIXTURES OF SAID PHASES

[75] Inventors: Mitri S. Najjar, Wappingers Falls, N.Y.; Arnulf Muan, Lacey Spring, Va.

[73] Assignee: Texaco Inc., White Plains, N.Y.

[21] Appl. No.: 457,215

[22] Filed: Dec. 26, 1989

[51] Int. Cl.$^5$ .............................................. B01J 21/06
[52] U.S. Cl. .................... 502/350; 502/353; 502/525; 423/593; 423/598
[58] Field of Search ....................... 502/350, 353, 525; 423/593, 598

[56] References Cited

U.S. PATENT DOCUMENTS

Re. 31,364  8/1983  Wise ..................................... 502/350
3,839,398 10/1974  Leto et al. ............................ 502/353
3,917,682 11/1975  Mizukami et al. ................... 502/350
4,002,653  1/1977  Reuter et al. ......................... 502/350
4,036,783  7/1977  Blechschmitt ....................... 502/350
4,048,112  9/1977  Matsushita et al. .................. 502/350

Primary Examiner—Anthony McFarlane
Attorney, Agent, or Firm—Robert A. Kulason; James J. O'Loughlin; Albert Brent

[57] ABSTRACT

Novel oxidation-reduction catalysts and the method for their preparation. The materials comprise stable phases involving $V_2O_3$ and $TiO_2$ and mixtures of said phases and have compositions that fall within specific areas in a binary composition diagram of $V_2O_3$ and $TiO_2$. A typical VT material has the formula $V_2TiO_5$. A typical E material has a formula $V_2Ti_2O_7$; and, a typical $\eta$ material has the formula $V_2Ti_3O_9$.

20 Claims, 1 Drawing Sheet

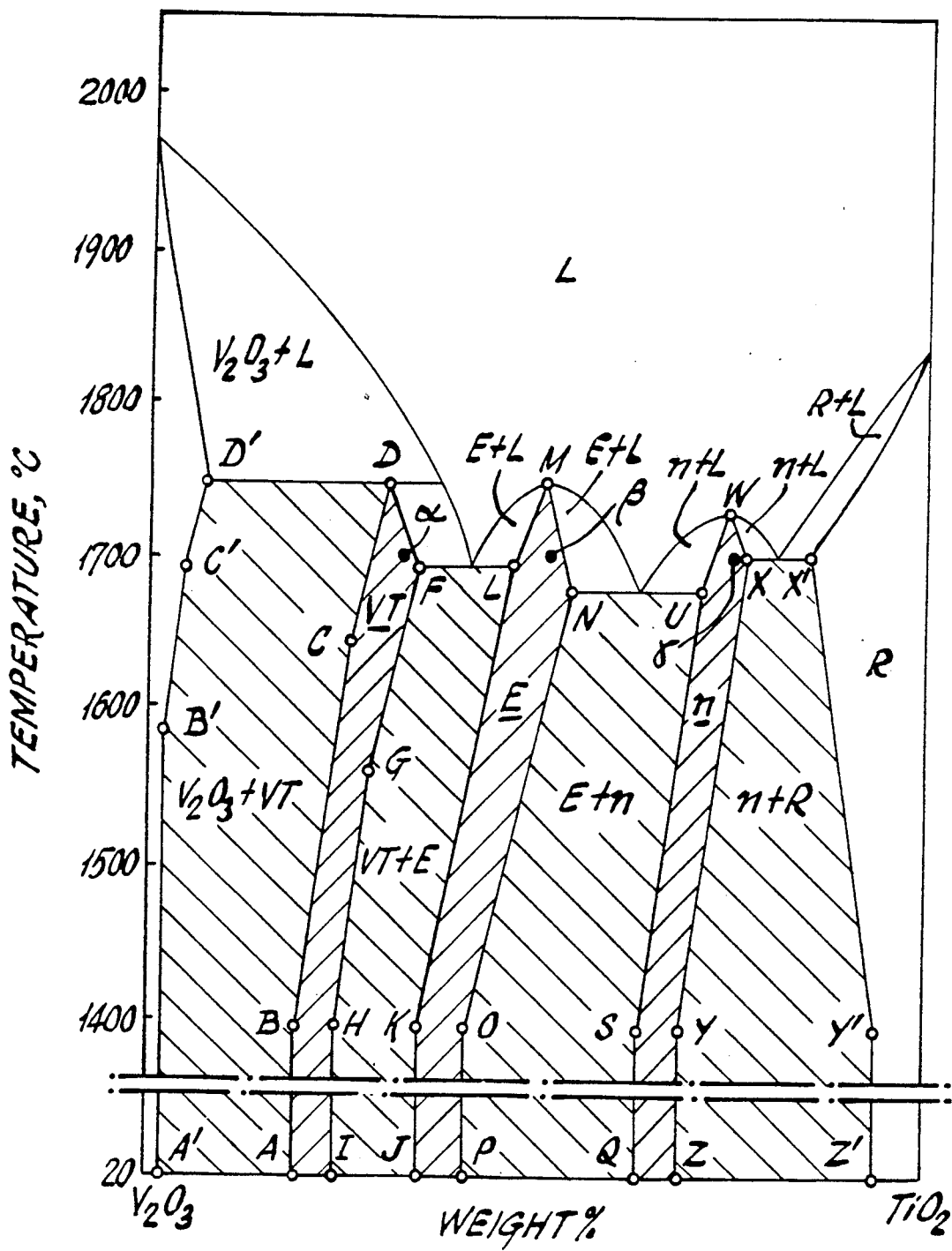

STABLE SOLID PHASES INVOLVING $V_2O_3 \cdot TIO_2$ AND MIXTURES OF SAID PHASES

BACKGROUND OF THE INVENTION

Field of the Invention

This invention relates to stable solid phases involving $V_2O_3$-$TiO_2$ and mixtures of said solid phases.

SUMMARY OF THE INVENTION

The present invention pertains to a novel oxidation-reduction catalyst and the method for its preparation. The material comprises three stable intermediate phases involving $V_2O_3$ and $TiO_2$ and designated VT, E, and $\eta$ as well as the following four mixtures thereof: $V_2O_3$+VT, VT+E, E+$\eta$, and $\eta$+R as shown in the accompanying drawing for the phase diagram.

The three stable intermediate phases involving $V_2O_3$ and $TiO_2$ and the aforesaid mixtures thereof as shown in the drawing are made by the process comprising the steps of:

(1) heating $V_2O_5$ powder having a particle size of less than about 50 microns in an atmosphere in which the partial pressure of oxygen is in the range of $10^{-8}$ to $10^{-10}$ atmosphere and the $CO_2/H_2$ volume ratio is in the range of about 2/1 to 0.5/1 while gradually increasing the temperature stepwise over a temperature range of about 600° C. to 1300° C. and holding the final temperature for a period of at least about 24 hrs. to ensure complete reduction of all vanadium to $V^{3+}$;

(2) heating $TiO_2$ powder having a particle size of less than about 50 microns for a period of about 10 to 14 hrs. at a temperature in the range of about 600° C. to 800° C.;

(3) thoroughly grinding together about 90 to 20 wt. % of $V_2O_3$ from (1), with about 10 to 80 wt. % of $TiO_2$ from (2) to produce a mixture having a grain size of less than about 50 microns, (4) pelletizing the mixtures from (3) at a pressure of about 5,000 psi; and (5) heating the pellets from (4) at a temperature in the range of about 1100° C. to 1600° C. for a period in the range of about 12 to 48 hrs. in an atmosphere in which the partial pressure of oxygen is in the range of $10^{-10}$ to $10^{-8}$ atmosphere.

In one embodiment, the pellets from step (5) are cooled to ambient temperature while at substantially the same partial pressure of oxygen as in step (5). Preferably, to prevent undue oxidation and moisture pickup, the cooled pellets are stored in a sealed container.

BRIEF DESCRIPTION OF THE DRAWING

The drawing depicts a binary composition diagram showing three useful stable solid phases involving $V_2O_3$-$TiO_2$ and four stable solid mixtures of said pure phases, as a function of temperature.

DESCRIPTION OF THE INVENTION

New stable solid phases have been synthesized by the subject invention in which the nature and extent of the formation of the stable phases involving vanadium oxide, notably $V_2O_3$, and the oxide of titanium, notably $TiO_2$, as components have been characterized. This work has led to synthesizing new phases in which vanadium is mostly in the +3 oxidation state. These phases are crystalline and are thermodynamically stable over a wide range of oxygen pressures and temperatures.

The newly synthesized three phases in the $V_2O_3$-$TiO_2$ system are shown in the drawing as falling within the three shaded areas in the binary composition diagram and having the vertices and corresponding coordinates in temperature °C. (Y-axis) and weight % (X-axis) as shown in Table I. The wt. % $TiO_2$ is equal to 100 - wt. % $V_2O_3$.

TABLE I

| | VT | | | E | | | $\eta$ | |
|---|---|---|---|---|---|---|---|---|
| Vertices | Temp. °C. | Wt. % $V_2O_3$ | Vertices | Temp. °C. | Wt. % $V_2O_3$ | Vertices | Temp. °C. | Wt. % $V_2O_3$ |
| A | 20 | 83 | J | 20 | 67 | Q | 20 | 39 |
| B | 1400 | 82 | K | 1400 | 65 | S | 1400 | 36 |
| C | 1650 | 74 | L | 1700 | 52 | U | 1680 | 28 |
| D | 1750 | 70 | M | 1750 | 49 | W | 1730 | 25 |
| F | 1700 | 65 | N | 1680 | 46 | X | 1710 | 23 |
| G | 1550 | 72 | O | 1400 | 59 | Y | 1400 | 32 |
| H | 1400 | 75 | P | 20 | 63 | Z | 20 | 35 |
| I | 20 | 78 | | | | | | |

The four mixed phases in the $V_2O_3$-$TiO_2$ system are shown in the drawing as falling within the shaded area having the vertices and corresponding coordinates in temperature °C. (Y-axis) and weight % (X-axis) as shown in Table II. The Wt. % $TiO_2$ is equal to 100 - Wt. % $V_2O_3$.

TABLE II

| | $V_2O_3$ + VT | | | VT + E | | | E + $\eta$ | | | $\eta$ + R | |
|---|---|---|---|---|---|---|---|---|---|---|---|
| Vertices | Temp. °C. | Wt. % $V_2O_3$ | Vertices | Temp. °C. | Wt. % $V_2O_3$ | Vertices | Temp. °C. | Wt. % $V_2O_3$ | Vertices | Temp. °C. | Wt. % $V_2O_3$ |
| A' | 20 | 99 | I | 20 | 78 | P | 20 | 63 | Z | 20 | 35 |
| B' | 1580 | 98 | H | 1400 | 75 | O | 1400 | 59 | Y | 1400 | 32 |
| C' | 1695 | 96 | G | 1550 | 72 | N | 1680 | 46 | X | 1710 | 23 |
| D' | 1750 | 93 | F | 1700 | 65 | U | 1680 | 28 | X' | 1710 | 15 |
| D | 1750 | 70 | L | 1700 | 52 | S | 1400 | 36 | Y' | 1400 | 7 |
| C | 1650 | 74 | K | 1400 | 65 | Q | 20 | 39 | Z' | 20 | 4 |
| B | 1400 | 82 | J | 20 | 67 | | | | | | |
| A | 20 | 83 | | | | | | | | | |

The materials are stable over the range of $V_2O_3$ in (wt. %) as shown in Table III. The remainder is $TiO_2$. While the minimum temperature that the materials are solid is less than 20° C., the maximum temperature that the materials remain solid is shown in Table III. The wt. % $TiO_2$ is equal to 100 - wt. % $V_2O_3$.

TABLE III

| Material | Wt. % of $V_2O_3$ In Stable Material | Maximum Temp For Solidity, °C. |
|---|---|---|
| $V_2O_3$ + VT | 93 to 70 | 1750 |
| VT | 70 | 1750 |
| VT + E | 65 to 52 | 1700 |
| E | 49 | 1750 |
| E + η | 46 to 28 | 1680 |
| η | 25 | 1730 |
| η + R | 23 to 15 | 1710 |

Some typical newly synthesized solid phases involving $V_2O_3$—$TiO_2$ are shown in the drawing by points α, β, and γ. The formulas for these points and the respective coordinates are shown in Table IV.

TABLE IV

| POINT | PHASE | FORMULA | Wt % $V_2O_3$ (Rem $TiO_2$) | TEMPERATURE °C. |
|---|---|---|---|---|
| α | VT | $V_2TiO_5$ | 65 | 1700 |
| β | E | $V_2Ti_2O_7$ | 49 | 1700 |
| δ | η | $V_2Ti_3O_9$ | 24 | 1700 |

The end members $V_2O_3$ and $TiO_2$ have corrundum-type and rutile structures, respectively. Of the three stable intermediate phases designated VT, E and η, as shown in the accompanying drawing for the phase diagram, the first, and most vanadium-rich among these phases, VT, is of especial interest. This phase has the composition $V_2TiO_5$. The remaining phases E and η display many of the complicated features of shear structures in the system Ti-O and similar relations in the system V—O.

The new phases in the $V_2O_3$—$TiO_2$ system are synthesized in the following manner: First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$ e.g. in the range of $10^{-8}$ to $10^{-10}$ atmospheres. This may be accomplished by using a gas mixture of high-purity $CO_2$ and $H_2$ in controlled proportions. The $CO_2/H_2$ ratio by volume is in the range of 2/1 to 0.5/1. The relatively low melting point of the starting vanadium oxide ($V_2O_5$), e.g. about 690° C., necessitates heating the oxide slowly. Starting at a temperature of about 600° C. the temperature is gradually increased stepwise over a period of about 12 to 24 hrs. to a final temperature of about 1300° C. At that temperature the oxide is held at least about 24 hrs. e.g. 24 to 30 hrs. to ensure complete reduction of all vanadium to $V^{3+}$ ($V_2O_3$). The identity of the reaction product, stable solid phases involving $V_2O_3$—$TiO_2$, may be confirmed by X-ray diffraction analysis.

Pre-heated analytical-grade oxides having a particle size of less than about 50 microns is used as starting materials for the other components of the stable phases to be synthesized The $TiO_2$ is heated for about 10 to 14 hrs. at a temperature in the range of about 600° C. to 800° C. prior to being used in preparation of the final materials.

The mixtures of the two oxide components are mechanically ground together under acetone in an agate mortar to ensure thorough mixing and a sufficiently small grain size e g. less than 50 microns. For example, about 90 to 20 wt. % of $V_2O_3$ is ground together with about 10 to 80 wt. % of $TiO_2$ to produce a mixture having a grain size of less than about 50 microns. Complete formation of the desired compounds in the succeeding heat treatment is thereby promoted. Next, the oxide mixtures are pelletized at a pressure of about 5,000 psi or higher. The pellets may have any conventional size e.g. 1/16" to 1". The pellets are then heated at a temperature in the range of about 1100° C. to 1600° C. for a period in the range of about 12 to 48 hrs. (depending on the nature and solidus temperature of the phase to be synthesized) in a vertical tube furnace with carefully controlled oxygen pressures, in the range of: $10^{-10}$ to $10^{-8}$ atmosphere. In the manner described previously for preparing $V_2O_3$, the pellets are heated in a furnace atmosphere provided by a gas mixture of high purity $CO_2$ and $H_2$ in various desired mixing ratios, typically in the range of about 2/1 to 0.5/1. The selected volume ratios are kept constant for the duration of the synthesis by use of a differential manometer. By this method the oxygen pressure at the specified temperature can be controlled to better than ±1%. The thermodynamic data for the water-gas reaction ($CO_2 + H_2 = CO + H_2O$), on which the calculations were based, are known with extremely high accuracy (better than 0.1%), and hence the method used ensures reliable accurate control of the oxidation state of vanadium -during the synthesis. This is extremely important for optimization of the properties of the finished product.

In addition to oxygen pressure, one other parameter influencing the oxidation state of vanadium in oxide phases has been utilized in synthesizing the new phases, viz. the provision of host structures which incorporate vanadium in one (or more) valence state(s) in strong preference to other valence states. In the present case, the stable solid phases of the system $V_2O_3$—$TiO_2$ serves this purpose.

The pellets of the stable solid phases involving $V_2O_3$—$TiO_2$ may be used as a catalyst for oxidation or reduction reactions, offering improved activity and yields and greater stability over a wider temperature range e.g. about 1000° C. or higher than that which is offered by typical oxidation catalysts. For example, as an oxidation catalyst the subject pellets may be used in the conversion of o-xylene to phthalic anhydride, butane to maleic anhydride, or alcohols to aldehydes or organic acids. As a reduction catalyst, the pellets may be used to reduce the oxides of nitrogen to nitrogen.

The stable solid phases involving $V_2O_3$—$TiO_2$, as described above, may be made under atmospheric conditions (volume ratio $CO_2/H_2 = 1/1$) such as to render almost all the vanadium in the trivalent state. In another embodiment under somewhat more oxidizing condition, such as With a partial pressure of oxygen in the range of about $10^{-8}$ to $10^{-3}$ atmosphere, an appreciable portion e.g. up to about 20 wt. % of the vanadium is present in the tetravalent state as vanadium enters into the $TiO_2$ containing phases by partial substitution of $V^{4+}$ for $Ti^{4+}$. Hence, it is anticipated that phases of considerable variation in V/Ti wt. ratios e.g. in the range of about 2.00 to 2.75 in the pseudobrookite ($V_2Ti$) phase, and considerable variation in $V^{4+}/V^{3+}$ ratios e.g., in the range of about 0 to 0.10 would be stable in this system at the previously mentioned somewhat higher oxygen pressures than those used in the first embodiment. These phases have interesting electronic and other physical properties, including catalytic activity for oxidation and reduction reactions. A method for preparing these stable solid phases and mixtures thereof involving $V_2O_3$—$TiO_2$ in which up to about 20 wt. % of the vanadium is present as $V^{4+}$ and substantially all of the remainder of the vanadium is present as $V^{3+}$ comprises the steps of:

(1) heating $V_2O_5$ powder having a particle size of less than about 50 microns in an atmosphere in which the partial pressure of oxygen is in the range of $10^{-8}$ to $10^{-3}$ atmospheres while gradually increasing the temperature stepwise over a temperature range of about 600° C. to 1300° C. and holding the final temperature for a period to ensure reduction of up to about 20 wt. % of the vanadium to $V^{4+}$ and substantially all of the remainder of the vanadium to $V^{3+}$;

(2) heating $TiO_2$ powder having a particle size of less than about 50 microns for a period of about 10 to 14 hrs. at a temperature in the range of about 600° C. to 800° C.;

(3) thoroughly grinding together about 90 to 20 wt. % of $V_2O_3$ from (1), with about 10 to 80 wt. % of $TiO_2$ to produce a mixture having a grain size of less than about 50 microns, (4) pelletizing the mixture from (3) at a pressure of about 5,000 psi; and (5) heating the pellets from (4) at a temperature in the range of about 1100° C. to 1600° C. for a period in the range of about 12 to 48 hrs. in an atmosphere in which the partial pressure of oxygen is in the range of $10^{-8}$ to $10^{-3}$ atmosphere.

The $V_2O_5$ powder in step (1) and the pellets in step (5) may be heated in an atmosphere comprising a gas mixture of high purity $CO_2$ and $H_2$ with a volume ratio of $CO_2/H_2$ in the range of about 10/1 to 1/1.

Various modifications of the invention as herein before set forth may be made without departing from the spirit and scope thereof, and therefore, only such limitations should be made as are indicated in the appended claims.

We claim:

1. Composition produced from $V_2O_3$ and $TiO_2$ wherein said composition corresponds to phase VT having vertices ABCDFGHI in a polygon shaped shaded area in the disclosed FIGURE, or phase E having vertices JKLMNOP in a polygon shaped shaded area in the disclosed FIGURE, or phase η having vertices QSUWXYZ in a polygon shaped shaded area in the disclosed FIGURE; and wherein each area in said FIGURE has the vertices and corresponding coordinates as shown in Table Ia below;

TABLE Ia

| Vertice | Temp. °C. | Wt. % $V_2O_3$ | Wt. % $TiO_2$ |
|---|---|---|---|
| | | VT | |
| A | 20 | 83 | 17 |
| B | 1400 | 82 | 18 |
| C | 1650 | 74 | 26 |
| D | 1750 | 70 | 30 |
| F | 1700 | 65 | 35 |
| G | 1550 | 72 | 28 |
| H | 1400 | 75 | 25 |
| I | 20 | 78 | 2 |
| | | E | |
| J | 20 | 67 | 33 |
| K | 1400 | 65 | 35 |
| L | 1700 | 52 | 48 |
| M | 1750 | 49 | 51 |
| N | 1680 | 46 | 54 |
| O | 1400 | 59 | 41 |
| P | 20 | 63 | 37 |
| | | η | |
| Q | 20 | 39 | 61 |
| S | 1400 | 36 | 64 |
| U | 1680 | 28 | 72 |
| W | 1730 | 25 | 75 |
| X | 1710 | 23 | 77 |
| Y | 1400 | 32 | 68 |
| Z | 20 | 35 | 65. |

2. A VT composition as provided in claim 1 having the formula $V_2TiO_5$ as illustrated by point α of the VT phase in said FIGURE and having the following coordinates in wt. %: $V_2O_3$ 65 and $TiO_2$ 35.

3. An E composition as provided in claim 1 having the formula $V_2Ti_2O_7$ as illustrated by point β of the E phase in (a) said FIGURE and having the following coordinates in wt. %: $V_2O_3$ 49 and $TiO_2$ 51.

4. A η composition as provided in claim 1 having the formula $V_2Ti_3O_9$ as illustrated by point δ of the n phase said FIGURE and having the following coordinates in wt. %: $V_2O_3$ 24 and $TiO_2$ 66.

5. A composition as provided in claim 1 wherein said $V_2O_3$ and $TiO_2$ have corrundum and rutile structures, respectively.

6. Composition produced from $V_2O_3$ and $TiO_2$ in which the vanadium is present in the trivalent and tetravalent states and said composition is characterized by its ability to catalyze oxidation reactions; and wherein said composition corresponds to phase VT having vertices ABCDFGHI in a polygon shaped shaded area in the disclosed FIGURE, or phase E having vertices JKLMNOP in a polygon shaped shaded area in the disclosed FIGURE, or phase η having vertices QSUWXYZ in a polygon shaped shaded area in the disclosed FIGURE; and wherein each area in said FIGURE has the vertices and corresponding coordinates as shown in Table Ia below;

TABLE Ia

| Vertice | Temp. °C. | Wt. % $V_2O_3$ | Wt. % $TiO_2$ |
|---|---|---|---|
| | | VT | |
| A | 20 | 83 | 17 |
| B | 1400 | 82 | 18 |
| C | 1650 | 74 | 26 |
| D | 1750 | 70 | 30 |
| F | 1700 | 65 | 35 |
| G | 1550 | 72 | 28 |
| H | 1400 | 75 | 25 |
| I | 20 | 78 | 2 |
| | | E | |
| J | 20 | 67 | 33 |
| K | 1400 | 65 | 35 |
| L | 1700 | 52 | 48 |
| M | 1750 | 49 | 51 |
| N | 1680 | 46 | 54 |
| O | 1400 | 59 | 41 |
| P | 20 | 63 | 37 |
| | | η | |
| Q | 20 | 39 | 61 |
| S | 1400 | 36 | 64 |
| U | 1680 | 28 | 72 |
| W | 1730 | 25 | 75 |
| X | 1710 | 23 | 77 |
| Y | 1400 | 32 | 68 |
| Z | 20 | 35 | 65. |

7. Composition produced from $V_2O_3$ and $TiO_2$ wherein said composition corresponds to phase $V_2O_3$+VT having vertices A'B'C'D'DCBA in a polygon shaped shaded area in the disclosed FIGURE, or phase VT+E having vertices IHGFLKJ in a polygon shaped shaded area in the disclosed FIGURE, or phase E+η having vertices PONUSQ in a polygon shaped shaded area in the disclosed FIGURE, or phase η+R having vertices ZYXX'Y'Z' in a polygon shaped shaded area in the disclosed FIGURE; and wherein each area in said FIGURE has the vertices and corresponding coordinates as shown in Tables IIb and IIc below;

TABLE IIb

| | $V_2O_3$ + VT | | | VT + E | | |
|---|---|---|---|---|---|---|
| Vertices | Temp. °C. | Wt. % $V_2O_3$ | Wt. % $TiO_2$ | Vertices | Temp. °C. | Wt. % $V_2O_3$ | Wt. % $TiO_2$ |
| A' | 20 | 99 | 1 | I | 20 | 78 | 22 |
| B' | 1580 | 98 | 2 | H | 1400 | 75 | 25 |
| C' | 1695 | 96 | 4 | G | 1550 | 72 | 28 |
| D' | 1750 | 93 | 7 | F | 1700 | 65 | 35 |
| D | 1750 | 70 | 30 | L | 1700 | 52 | 48 |
| C | 1650 | 74 | 26 | K | 1400 | 65 | 35 |
| B | 1400 | 82 | 18 | J | 20 | 67 | 33 |
| A | 20 | 83 | 17 | | | | |

TABLE IIc

| | E + η | | | η + R | | |
|---|---|---|---|---|---|---|
| Vertices | Temp. °C. | Wt. % $V_2O_3$ | Wt. % $TiO_2$ | Vertices | Temp. °C. | Wt. % $V_2O_3$ | Wt. % $TiO_2$ |
| P | 20 | 63 | 37 | Z | 20 | 35 | 65 |
| O | 1400 | 59 | 41 | Y | 1400 | 32 | 68 |
| N | 1680 | 46 | 54 | X | 1710 | 23 | 77 |
| U | 1680 | 28 | 72 | X' | 1710 | 15 | 85 |
| S | 1400 | 36 | 64 | Y' | 1400 | 7 | 93 |
| Q | 20 | 39 | 61 | Z' | 20 | 4 | 96 |

8. Composition produced from $V_2O_3$ and $TiO_2$ in which the vanadium is present in the trivalent and tetravalent states and said composition are characterized by its ability to catalyze oxidation reactions, wherein said composition corresponds to phase $V_2O_3$+VT having vertices A'B'C'D'DCBA in a polygon shaped shaded area in the disclosed FIGURE, or phase VT+E having vertices IHGFLKJ in a polygon shaped shaded area in the disclosed FIGURE, or phase E+η having vertices PONUSQ in a polygon shaped shaded area in the disclosed FIGURE, or phase η+R having vertices ZYXX'Y'Z' in a polygon shaped shaded area in the disclosed FIGURE; and wherein each area in said FIGURE has the vertices and corresponding coordinates as shown in Tables IIb and IIc below;

TABLE IIb

| | $V_2O_3$ + VT | | | VT + E | | |
|---|---|---|---|---|---|---|
| Vertices | Temp. °C. | Wt. % $V_2O_3$ | Wt. % $TiO_2$ | Vertices | Temp. °C. | Wt. % $V_2O_3$ | Wt. % $TiO_2$ |
| A' | 20 | 99 | 1 | I | 20 | 78 | 22 |
| B' | 1580 | 98 | 2 | H | 1400 | 75 | 25 |
| C' | 1695 | 96 | 4 | G | 1550 | 72 | 28 |
| D' | 1750 | 93 | 7 | F | 1700 | 65 | 35 |
| D | 1750 | 70 | 30 | L | 1700 | 52 | 48 |
| C | 1650 | 74 | 26 | K | 1400 | 65 | 35 |
| B | 1400 | 82 | 18 | J | 20 | 67 | 33 |
| A | 20 | 83 | 17 | | | | |

TABLE IIc

| | E + η | | | η + R | | |
|---|---|---|---|---|---|---|
| Vertices | Temp. °C. | Wt. % $V_2O_3$ | Wt. % $TiO_2$ | Vertices | Temp. °C. | Wt. % $V_2O_3$ | Wt. % $TiO_2$ |
| P | 20 | 63 | 37 | Z | 20 | 35 | 65 |
| O | 1400 | 59 | 41 | Y | 1400 | 32 | 68 |
| N | 1680 | 46 | 54 | X | 1710 | 23 | 77 |
| U | 1680 | 28 | 72 | X' | 1710 | 15 | 85 |
| S | 1400 | 36 | 64 | Y' | 1400 | 7 | 93 |
| Q | 20 | 39 | 61 | Z' | 20 | 4 | 96 |

9. A composition as provided in claim 8 wherein said $V_2O_3$ and $TiO_2$ have corrundum and rutile structures, respectively.

10. A method of preparing a stable composition and mixtures of said stable composition from $V_2O_3$ and $TiO_2$, wherein said composition fall within a specific area in a binary composition diagram of $V_2O_3$ and $TiO_2$ comprising the steps of
 (1) heating $V_2O_5$ powder having a particle size of less than about 50 microns in an atmosphere in which the partial pressure of oxygen is in the range of $10^{-8}$ to $10^{-10}$ atmospheres by starting at a temperature of about 600° C. and increasing the temperature over a period of about 12 to 24 hours to a final temperature of about 1300° C., and holding the final temperature for a period to ensure complete reduction of all vanadium to $V^{+3}$;
 (2) heating $TiO_2$ powder having a particle size of less than about 50 microns for a period of about 10 to 14 hrs at a temperature in the range of about 600° C. to 800° C.;
 (3) thoroughly grinding together about 90 to 20 wt. % of $V_2O_3$ from (1), with about 10 to 80 wt. % of $TiO_2$ to produce a mixture having a grain size of less than about 50 microns,
 (4) pelletizing the mixture from (30 at a pressure of about 5,000 psi; and
 (5) heating the pellets from (4) at a temperature in the range of about 1100° C. to 1600° C. for a period in the range of about 12 to 48 hrs. in an atmosphere in which the partial pressure of oxygen is in the range of $10^{-10}$ to $10^{-8}$ atmosphere.

11. The method of claim 10 wherein the pellets from (5) are cooled to ambient temperature, while at substantially the same partial pressure of oxygen as in (5); and storing the cooled pellets in a sealed container.

12. The method of claim 10 where in step (1) said $V_2O_5$ powder is heated in an atmosphere comprising a gas mixture of $CO_2$ and $H_2$ with a volume ratio of $CO_2/H_2$ in the range of about 2/1 to 0.5/1.

13. The method of claim 10 where in step (5) said pellets are heated in an atmosphere comprising a gas mixture of $CO_2$ and $H_2$ with a volume ratio of $CO_2/H_2$ in the range of about 2/1 to 0.5/1.

14. The method of claim 10 wherein said $V_2O_3$ and $TiO_2$ have corrundum and rutile structures, respectively.

15. The method of claim 10 wherein said composition corresponds to either phase VT having vertices ABCDFGHI in a polygon shaped shaded area in the disclosed FIGURE, or phase E having vertices JKLMNOP in a polygon shaped shaded area in the disclosed FIGURE, or phase η having vertices QSUWXYZ in a polygon shaped shaded area in the disclosed FIGURE; or phase $V_2O_3$+VT having vertices A'B'C'D'DCBA in a polygon shaped shaded area in the disclosed FIGURE, or phase VT+E having vertices IHGFLKJ in a polygon shaped shaded area in the disclosed FIGURE, or phase E+η having vertices PONUSQ in a polygon shaped shaded area in the disclosed FIGURE, or phase η+R having vertices ZYXX'Y'Z' in a polygon shaped shaded area in the disclosed FIGURE; wherein each area in said FIGURE have the vertices and corresponding coordinates as shown in Tables Ia, IIb and IIc below;

TABLE Ia

| Vertice | Temp. °C. | Wt. % $V_2O_3$ | Wt. % $TiO_2$ |
|---|---|---|---|
| VT | | | |
| A | 20 | 83 | 17 |
| B | 1400 | 82 | 18 |
| C | 1650 | 74 | 26 |
| D | 1750 | 70 | 30 |
| F | 1700 | 65 | 35 |
| G | 1550 | 72 | 28 |
| H | 1400 | 75 | 25 |
| I | 20 | 78 | 2 |
| E | | | |
| J | 20 | 67 | 33 |
| K | 1400 | 65 | 35 |
| L | 1700 | 52 | 48 |
| M | 1750 | 49 | 51 |
| N | 1680 | 46 | 54 |
| O | 1400 | 59 | 41 |
| P | 20 | 63 | 37 |
| η | | | |
| Q | 20 | 39 | 61 |
| S | 1400 | 36 | 64 |
| U | 1680 | 28 | 72 |
| W | 1730 | 25 | 75 |
| X | 1710 | 23 | 77 |
| Y | 1400 | 32 | 68 |
| Z | 20 | 35 | 65. |

TABLE IIb

| $V_2O_3$ + VT | | | | VT + E | | | |
|---|---|---|---|---|---|---|---|
| Vertices | Temp. °C. | Wt. % $V_2O_3$ | Wt. % $TiO_2$ | Vertices | Temp. °C. | Wt. % $V_2O_3$ | Wt. % $TiO_2$ |
| A' | 20 | 99 | 1 | I | 20 | 78 | 22 |
| B' | 1580 | 98 | 2 | H | 1400 | 75 | 25 |
| C' | 1695 | 96 | 4 | G | 1550 | 72 | 28 |
| D' | 1750 | 93 | 7 | F | 1700 | 65 | 35 |
| D | 1750 | 70 | 30 | L | 1700 | 52 | 48 |
| C | 1650 | 74 | 26 | K | 1400 | 65 | 35 |
| B | 1400 | 82 | 18 | J | 20 | 67 | 33 |
| A | 20 | 83 | 17 | | | | |

TABLE IIc

| E + η | | | | η + R | | | |
|---|---|---|---|---|---|---|---|
| Vertices | Temp. °C. | Wt. % $V_2O_3$ | Wt. % $TiO_2$ | Vertices | Temp. °C. | Wt. % $V_2O_3$ | Wt. % $TiO_2$ |
| P | 20 | 63 | 37 | Z | 20 | 35 | 65 |
| O | 1400 | 59 | 41 | Y | 1400 | 32 | 68 |
| N | 1680 | 46 | 54 | X | 1710 | 23 | 77 |
| U | 1680 | 28 | 72 | X' | 1710 | 15 | 85 |
| S | 1400 | 36 | 64 | Y' | 1400 | 7 | 93 |
| Q | 20 | 39 | 61 | Z' | 20 | 4 | 96 |

16. The method of claim 15 wherein at a temperature of 1700° C. said VT phase has the formula $V_2TiO_5$ as illustrated by point α in the composition diagram in the FIGURE and has the following coordinates in wt. %: $V_2O_3$ 65, and $TiO_2$ 35.

17. The method of claim 15 wherein at a temperature of 1700° C. said E phase has the formula $V_2TiO_2O_7$ as illustrated by point β in the composition diagram in the FIGURE, and having the following coordinates in wt. % $V_2O_3$ 49 and $TiO_2$ 51.

18. The method of claim 15 wherein at a temperature of 1700° C. said η phase has the formula $V_2Ti_3O_9$ as illustrated by point γ in the composition diagram in the FIGURE, and has the following coordinates in Wt. %: $V_2O_3$ 24 and $TiO_2$ 76.

19. A method of preparing stable composition and mixtures of said stable composition from $V_2O_3$ and $TiO_2$, comprising the steps of:
(1) heating $V_2O_5$ powder having a particle size of less than about 50 microns in an atmosphere in which the partial pressure of oxygen is in the range of $10^{-8}$ to $10^{-3}$ atmospheres by starting at a temperature of about 600° C. and increasing the temperature over a period of about 12 to 24 hours to a final temperature of about 1300° C., and holding the final temperature for a period to ensure reduction of up to about 20 wt. % of the vanadium to $V^{4+}$ and substantially all of the remainder to $V^{3+}$;
(2) heating $TiO_2$ powder having a particle size of less than about 50 microns for a period of about 10 to 14 hrs at a temperature in the range of about 600° C. to 800° C.;
(3) thoroughly grinding together about 90 to 20 wt. % of $V_2O_3$ f from (1), with about 10 to 80 wt. % of $TiO_2$ to produce a mixture having a grain size of less than about 50 microns,
(4) pelletizing the mixture from (3) at a pressure of about 5,000 psi; and
(5) heating the pellets from (4) at a temperature in the range of about 1100° C. to 1600° C. for a period in the range of about 12 to 48 hrs. in an atmosphere in which the partial pressure of oxygen is in the range of $10^{-8}$ to $10^{-3}$ atmospheres.

20. The method of claim 19 where said $V_2O_5$ powder in step (1) and said pellets in step (5) are heated in an atmosphere comprising a gas mixture of $CO_2$ and $H_2$ with a volume ratio of $CO_2/H_2$ in the range of about 10/1 to 1/1.

* * * * *